(12) United States Patent
Shin et al.

(10) Patent No.: US 9,711,294 B2
(45) Date of Patent: Jul. 18, 2017

(54) TANTALUM CAPACITOR AND METHOD OF MANUFACTURING THE SAME

(71) Applicant: SAMSUNG ELECTRO-MECHANICS CO., LTD., Suwon-Si, Gyeonggi-Do (KR)

(72) Inventors: Hong Kyu Shin, Suwon-Si (KR); Wan Suk Yang, Suwon-Si (KR); Kyung Sup Choi, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 92 days.

(21) Appl. No.: 14/670,005

(22) Filed: Mar. 26, 2015

(65) Prior Publication Data

US 2016/0027589 A1 Jan. 28, 2016

(30) Foreign Application Priority Data

Jul. 28, 2014 (KR) ........................ 10-2014-0095980

(51) Int. Cl.
*H01G 9/15* (2006.01)
*H01G 9/10* (2006.01)
*H01G 9/012* (2006.01)

(52) U.S. Cl.
CPC ............... *H01G 9/10* (2013.01); *H01G 9/012* (2013.01); *H01G 9/15* (2013.01)

(58) Field of Classification Search
None
See application file for complete search history.

(56) References Cited

U.S. PATENT DOCUMENTS

| 2003/0151884 | A1 | 8/2003 | Matsumoto |
| 2003/0218858 | A1 | 11/2003 | Kim et al. |
| 2006/0126273 | A1* | 6/2006 | Ishijima ................. H01G 2/065 361/540 |
| 2009/0122470 | A1* | 5/2009 | Matsuoka ................ H01G 2/06 361/540 |
| 2011/0261503 | A1* | 10/2011 | Aoyama .............. H01G 9/0029 361/524 |

FOREIGN PATENT DOCUMENTS

KR 20030090303 A 11/2003

* cited by examiner

*Primary Examiner* — Dion R Ferguson
(74) *Attorney, Agent, or Firm* — McDermott Will & Emery LLP

(57) ABSTRACT

There are provided a tantalum capacitor having groove parts extended from a lower surface of a positive electrode terminal to an inner part of a wire connection part; and a method of manufacturing a tantalum capacitor, the method including: forming a wire connection part of a positive electrode terminal by applying pressure to a portion of a conductive metal plate upwardly from a bottom surface thereof.

4 Claims, 10 Drawing Sheets

TANTALUM CAPACITOR AND METHOD OF MANUFACTURING THE SAME

CROSS-REFERENCE TO RELATED APPLICATION

This application claims the priority and benefit of Korean Patent Application No. 10-2014-0095980 filed on Jul. 28, 2014, with the Korean Intellectual Property Office, the disclosure of which is incorporated herein by reference.

BACKGROUND

The present disclosure relates to a tantalum capacitor and a method of manufacturing the same.

Tantalum (Ta) is a material widely used throughout various industrial sectors, such as within the aerospace industry and in the defense sector, as well as in the electrical, electronic, mechanical, and chemical fields, due to possessing mechanical and physical properties such as a high melting point, excellent flexibility, excellent corrosion-resistance, and the like.

Since a stable anodic oxide film may be formed on tantalum, the tantalum material has been widely used as a positive electrode material in small capacitors. In accordance with the rapid development of information technology (IT), information and communications technology (ICT) and electronics technology, tantalum has been increasingly used on a year-on-year basis.

In existing tantalum capacitors, a positive electrode terminal is formed to have a main frame used as an external electrode and a sub frame extended from the main frame by a distance equal to a height of a tantalum wire in order to connect the main frame to the tantalum wire.

Here, the main frame and the sub frame are separately manufactured, and are then connected to each other in a welding process.

However, such a welding process makes an entire manufacturing process relatively complicated and causes problems such as excessive operation time in the welding process, defective products, and the like, which may deteriorate a production yield of the tantalum capacitor.

SUMMARY

An aspect of the present disclosure may provide a tantalum capacitor capable of being manufactured in a simplified manufacturing process and having an improved production yield, with a decreased incidence rate of defective products, by omitting a welding process at the time of manufacturing a positive electrode terminal, and a method of manufacturing the same.

According to an aspect of the present disclosure, there is provided a tantalum capacitor having groove parts extended from a lower surface of a positive electrode terminal to an inner part of a wire connection part.

According to another aspect of the present disclosure, a method of manufacturing a tantalum capacitor may include forming a wire connection part of a positive electrode terminal by applying pressure to a portion of a conductive metal plate upwardly from a bottom surface thereof.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
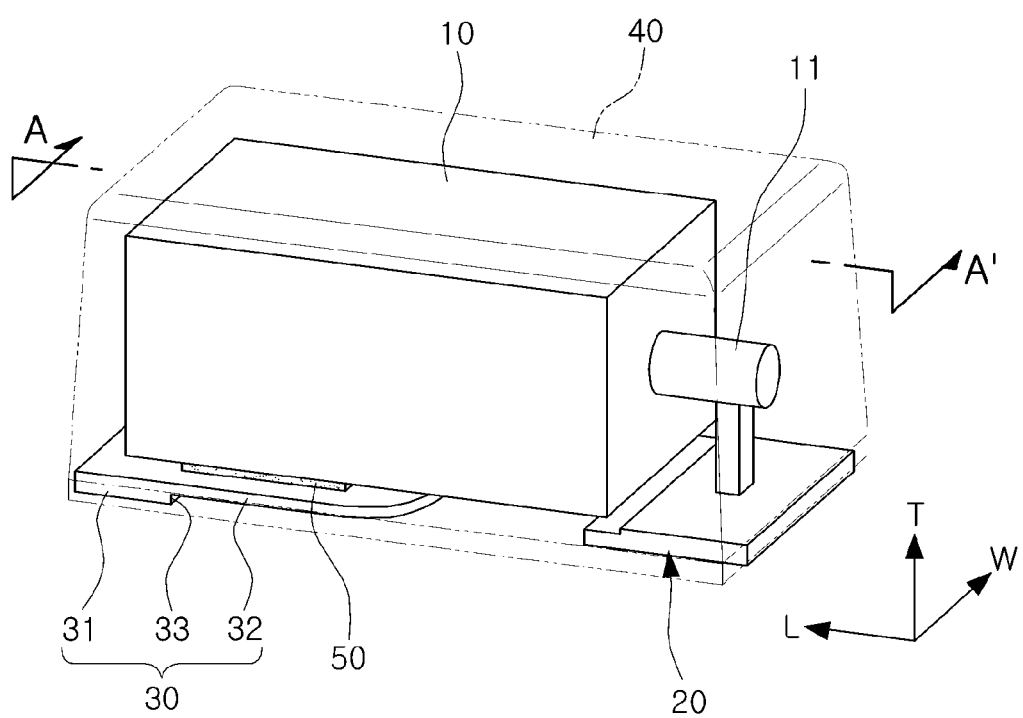
FIG. 1 is a transparent perspective view schematically illustrating a tantalum capacitor according to an exemplary embodiment in the present disclosure.

Exemplary embodiments in the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements maybe exaggerated for clarity, and the same reference numerals will be used throughout to designate the same or like elements.

Further, in the exemplary embodiment in the present disclosure, for convenience of explanation, a direction in which a tantalum wire is exposed in a capacitor body is defined as a front direction, a direction opposing the front direction is defined as a back direction, directions perpendicular with respect to the front and back directions are defined as both side directions, and both surfaces of the capacitor body in a thickness direction are defined as an upper surface and a lower surface (or a mounting surface).

Figure 2:
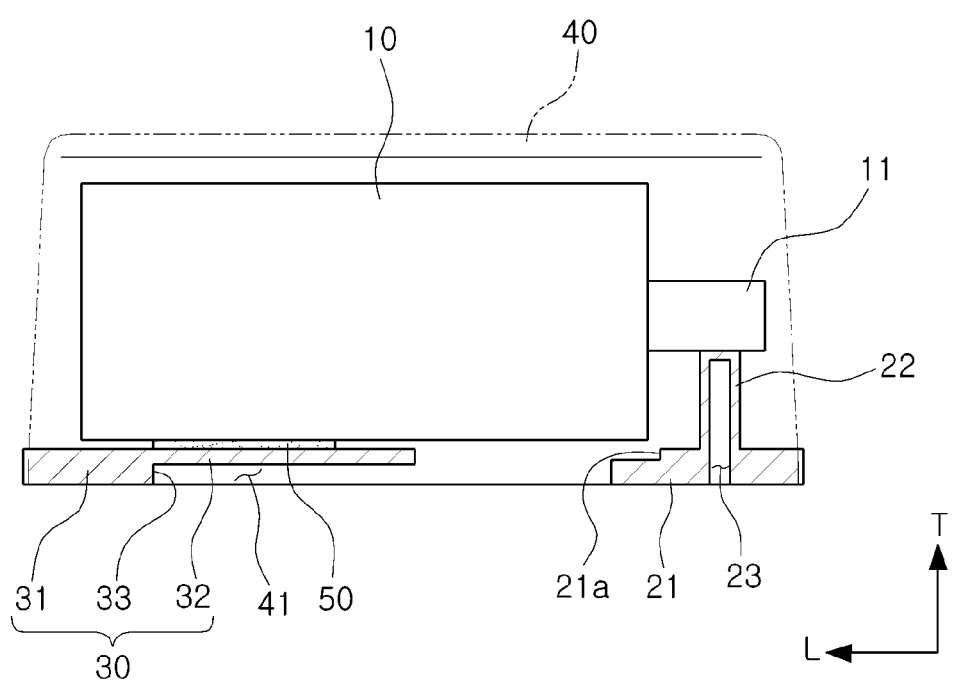
FIG. 2 is a cross-sectional view taken along line A-A' of FIG. 1.
Figure 3:
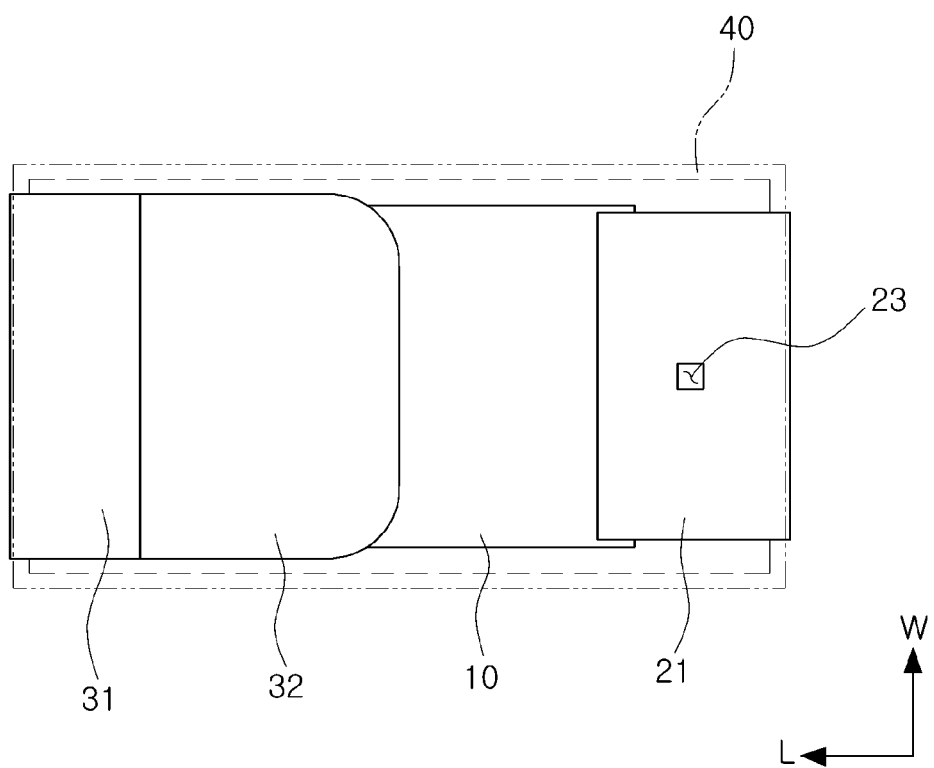
FIG. 3 is a transparent bottom view illustrating a bottom surface of the tantalum capacitor of FIG. 1.

FIG. 1 is a transparent perspective view schematically illustrating a tantalum capacitor according to an exemplary embodiment in the present disclosure, FIG. 2 is a cross-sectional view taken along line A-A' of FIG. 1, and FIG. 3 is a transparent bottom view illustrating a bottom surface of the tantalum capacitor of FIG. 1.

Referring to FIGS. 1 through 3, the tantalum capacitor according to an exemplary embodiment in the present disclosure may include a capacitor body 10; a tantalum wire 11; a positive electrode terminal 20; a negative electrode terminal 30; and a molding part 40.

The capacitor body 10 may be formed using a tantalum powder, and may function as a negative electrode of the capacitor.

The capacitor body 10 may be formed of a porous valve acting metal body and may be manufactured by sequentially forming a dielectric layer, a solid electrical layer, and a negative electrode layer on a surface of the porous valve acting metal body.

As an example, the capacitor body 10 may be manufactured by mixing and stirring a tantalum powder and a binder with each other at a predetermined ratio, compressing the mixed powder to form a rectangular parallelepiped, and then sintering the formed rectangular parallelepiped at a relatively high temperature under high vacuum atmosphere.

In more detail, the tantalum capacitor may have a structure in which voids formed when a tantalum powder is sintered and solidified are present. The capacitor body 10 may be manufactured by forming tantalum oxide ($Ta_2O_5$) on a surface of tantalum using an anodic oxidation method, forming a conductive polymer layer or a manganese dioxide ($MnO_2$) layer, which is an electrolyte, on the tantalum oxide using the tantalum oxide as a dielectric, and forming a carbon layer and a metal layer on the manganese dioxide layer or the conductive polymer layer.

In addition, carbon and silver (Ag) may be applied onto a surface of the capacitor body 10, as necessary.

The carbon is to decrease contact resistance on the surface of the capacitor body 10, and the silver (Ag) is to improve electrical connectivity when the capacitor body 10 is electrically connected to the negative electrode terminal 20 through the electrical connection portion, or the like.

The tantalum wire 11 may function as a positive electrode of the capacitor.

The tantalum wire 11 may have an insertion region positioned in the capacitor body 10 and a non-insertion region extended from the insertion to be exposed through one end surface of the capacitor body 10 in the front direction.

In the exemplary embodiment of the present disclosure, the tantalum wires 11 may be exposed through one end surface of the capacitor body 10 in a length direction, respectively. However, the present disclosure is not limited thereto.

For example, as necessary, the tantalum wire 11 of the present disclosure may be exposed through one side surface of the capacitor body 10 in a width direction, and in this case, the positive electrode terminal and the negative electrode terminal may also be disposed to be spaced apart from each other in the width direction of the molding part 40 to correspond to the exposed tantalum wire.

In addition, the tantalum wire 11 may be inserted into a mixture of the tantalum powder and the binder and may be mounted, before compressing the mixed powder of the tantalum powder and the binder.

For example, the capacitor body 10 may be manufactured by inserting the tantalum wire 11 into the tantalum powder mixed with the binder to be mounted therein so as to form a tantalum element having a desirable size, and then sintering the tantalum element at a temperature of about 1,000 to 2,000° C. under high vacuum atmosphere ($10^{-5}$ torr or less) for about 30 minutes.

Here, the tantalum wire 11 may be positioned in a direction the same as a direction of the capacitor body 10 in the length direction.

The positive electrode terminal 20 may be formed of a conductive metal such as nickel/iron alloy, or the like, and may include a positive electrode terminal part 21 and a wire connection part 22.

The positive electrode terminal part 21 may be exposed to a lower surface of the molding part 40, and may be used as a connection terminal for electrical connection to a different electronic product.

In addition, the positive electrode terminal part 21 may have a step portion 21a formed on a portion of an upper surface thereof.

Here, the step portion 21a may serve to prevent a short-circuit caused by contact between the capacitor body 10 and the positive electrode terminal part 21.

The wire connection part 22 is a part protruding upwardly from the portion of the upper surface of the positive electrode terminal part 21, and an upper end of the wire connection part 22 maybe electrically connected to the tantalum wire 11.

Here, an upper end part of the wire connection part 22 maybe variously changed to have a square shape, a curved surface, or the like.

Here, the wire connection part 22 and the tantalum wire 11 may be attached to each other, for example, by electric welding, and the like.

In detail, the electric welding may be performed by using an electric spot welding method. However, the present disclosure is not limited thereto.

In addition, the wire connection part 22 may have a groove part 23 formed in an inner side in a T-direction, and here, a lower surface of the groove part 23 may have an opening form.

The groove part 23 may be filled with molding materials at the time of forming the molding part 40 to be described below to reinforce coupling force between the positive electrode terminal 20 and the molding part 40, thereby improving adhesion strength of the positive electrode terminal 20, such that defects caused by soldering at the time of mounting the tantalum capacitor on a substrate, or the like, may be significantly decreased.

In addition, a width of the upper end of the wire connection part 22 may be changed according to a width of the groove part 23. For example, when the width of the groove part 23 is increased, an area of contact between the wire connection part 22 and the tantalum wire 11 is also increased in proportion to the increased width of the groove part 23, such that ESR of the capacitor may be decreased, and at the time of welding with the tantalum wire 11, a welding defect rate may be reduced.

Therefore, the adhesion strength of the positive electrode terminal 20 may be significantly improved due to an increase in a coupling strength with the molding part 40 and an increase in a coupling strength with the tantalum wire 11 of the wire connection part 22.

Here, the upper end part of the groove part 23 may be variously changed to have a square shape, a curved surface, or the like.

The negative electrode terminal 30 may be formed of a conductive metal such as a nickel/iron alloy, or the like.

The negative electrode terminal 30 may be spaced apart from the positive electrode terminal part 21 of the positive electrode terminal 20 in an L direction in parallel to each other, and a lower surface of the negative electrode terminal may be exposed to a lower surface of the molding part 40 to be used as a connection terminal for electrical connection with other electronic products.

An upper surface of the negative electrode terminal 30 may be flat to secure an adhesion area with the capacitor body 10, and the capacitor body 10 may be mounted on and may be electrically connected to the negative electrode terminal 30.

In addition, the negative electrode terminal 30 may have a step 33 so that the molding part 41 is formed on a portion of a lower surface of the negative electrode terminal 30.

For example, in the exemplary embodiment of the present disclosure, a structure of the step maybe formed by wet etching or stamping a second conductive metal plate configuring the negative electrode terminal 30 so that the negative electrode terminal 30 is exposed to the lower surface of the molding part 40.

In addition, in the exemplary embodiment of the present disclosure, the negative electrode terminal 30 may be divided into a negative electrode terminal part 31 and a negative electrode mounting part 32 on which the capacitor body 10 is mounted, based on the step 33.

Meanwhile, a conductive adhesion layer 50 may be formed between an upper surface of the negative electrode mounting part 32 of the negative electrode terminal 30 and a lower surface of the capacitor body 10 to improve adhesion strength of the negative electrode terminal 30.

The conductive adhesive layer 50 may be formed, for example, by dispensing or dotting a predetermined amount of conductive adhesive including an epoxy-based thermosetting resin and a conductive metal powder. However, the present disclosure is not limited thereto.

In addition, the conductive metal powder may be silver (Ag). However, the present disclosure is not limited thereto.

The molding part 40 may be formed by transfer-molding a resin such as an epoxy molding compound (EMC), or the like, to enclose the capacitor body 10.

The molding part 40 may serve to protect the tantalum wire 11 and the capacitor body 10 from the outside, and further serve to insulate the capacitor body 10 and the positive electrode terminal 20 from each other.

Here, the molding part 40 may be formed so that a lower surface of the positive electrode terminal part 21 of the positive electrode terminal 20 and a lower surface of the negative electrode terminal part 31 of the negative electrode terminal 30 may be exposed.

Figure 4:
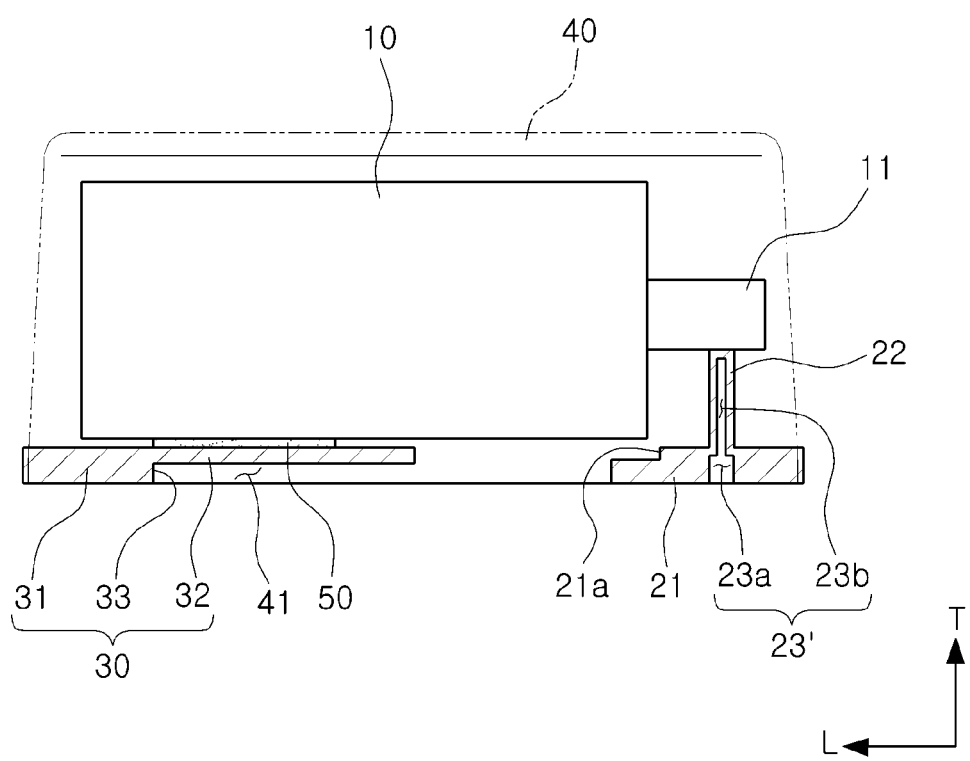
FIG. 4 is a cross-sectional view schematically illustrating a tantalum capacitor according to another exemplary embodiment in the present disclosure.

FIG. 4 is a cross-sectional view schematically illustrating a tantalum capacitor according to another exemplary embodiment in the present disclosure.

Here, since structures of the capacitor body 10, the tantalum wire 11, the negative electrode terminal 30 and the molding part 40 are similar to those of the tantalum capacitor according to the previously described exemplary embodiment in the present disclosure, a detailed description thereof will be omitted in order to avoid an overlapped description, and the positive electrode terminal having a structure different from that of the tantalum capacitor according to the previously described exemplary embodiment in the present disclosure will be mainly described.

Referring to FIG. 4, the groove parts 23' may include a first groove part 23a formed in the positive electrode terminal part 21 in a T direction, and a second groove part 23b formed in the wire connection part 22 in the T direction.

The second groove part 23b may be communicated with the first groove part 23a, and may have a width smaller than that of the first groove part 23a, and in this case, a position of the wire connection part 22 may be higher than that of the wire connection part according to the previously described exemplary embodiment.

For example, by forming the groove part 23' in a two-step structure, the first groove part 23a having a relatively large width may be filled with a relatively large amount of molding materials while maintaining connectivity with the wire connection part 22 as it is, to thereby reinforce coupling force between the positive electrode terminal 20 and the molding part 40, such that adhesion strength of the positive electrode terminal 20 may be improved.

Hereinafter, a method of manufacturing a tantalum capacitor according to an exemplary embodiment in the present disclosure will be described.

First, the positive electrode terminal 20 including the positive electrode terminal part 21 and the wire connection part 22 are prepared by using a first conductive metal plate 200 in a flat shape.

The first conductive metal plate 200 may be manufactured by a molding method using a punching, a stamping, or the like, an etching method, or the like. However, the present disclosure is not limited thereto.

Here, a reference numeral 200 may correspond to a reference numeral 21 of FIG. 2 as described above, and a reference numeral 220 may correspond to a reference numeral 22 of FIG. 2 as described above.

In preparing the positive electrode terminal 20, a portion of a first conductive metal plate 200 may be pressurized upwardly from a bottom surface thereof so as to protrude upwardly, for example, by a blanking method, wherein a portion remaining to be horizontal to the first conductive metal plate 200 may become the positive electrode terminal part 21 and an upper end of a portion protruding upwardly 220 may contact a non-insertion region of the tantalum wire 11 to thereby be electrically connected to each other, such that the portion protruding upwardly 220 may become the wire connection part 22.

Here, the first conductive metal plate 200 may be an alloy including at least one of copper or nickel. However, the present disclosure is not limited thereto.

In addition, for example, the first conductive metal plate 200 may have a thickness of 0.1 to 0.2 mm. However, the present disclosure is not limited thereto.

FIGS. 5A through 5E are side cross-sectional views illustrating a method of manufacturing the positive electrode terminal in the tantalum capacitor according to an exemplary embodiment in the present disclosure in sequence.

Figure 5A:
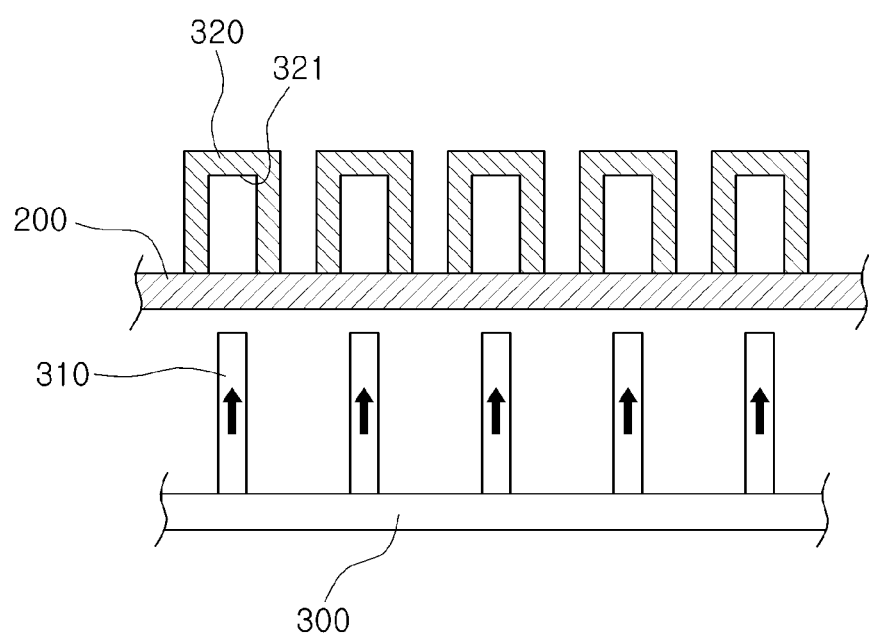
FIGS. 5A through 5E are side cross-sectional views illustrating a method of manufacturing a positive electrode terminal in the tantalum capacitor according to an exemplary embodiment in the present disclosure in sequence.
Figure 5B:
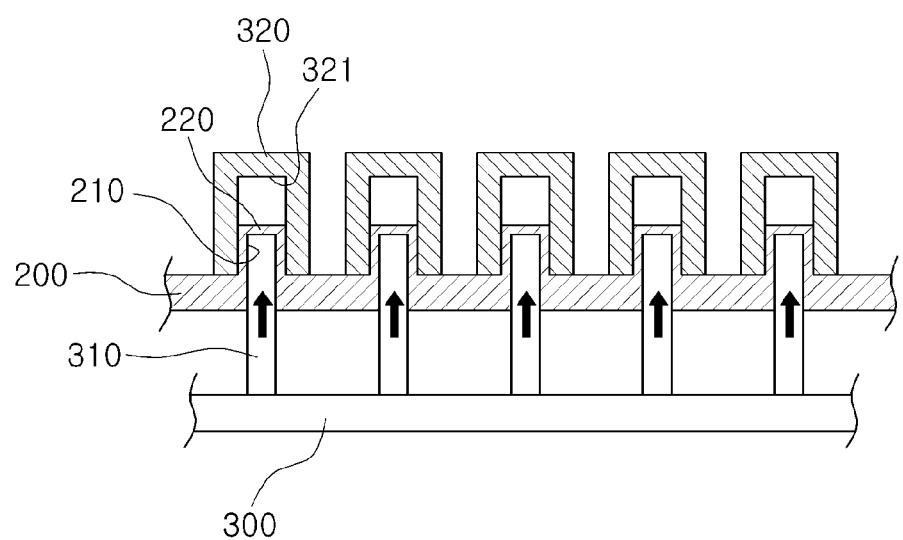
Figure 5C:
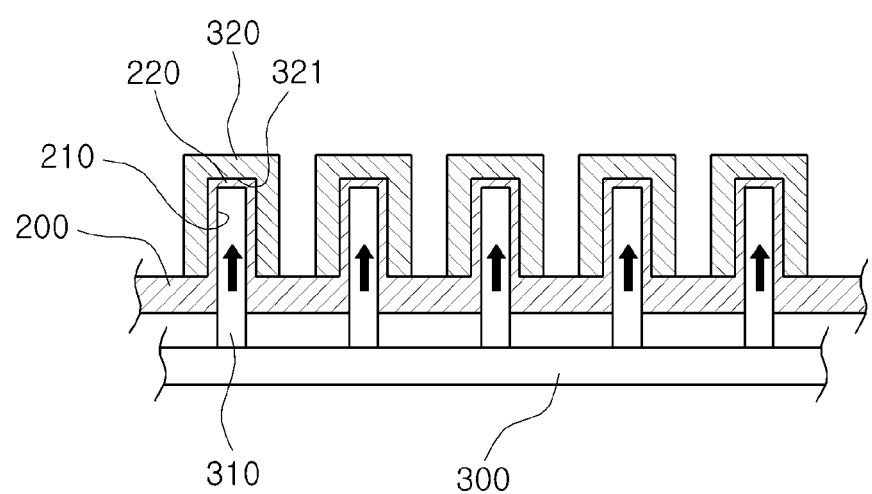
Figure 5D:
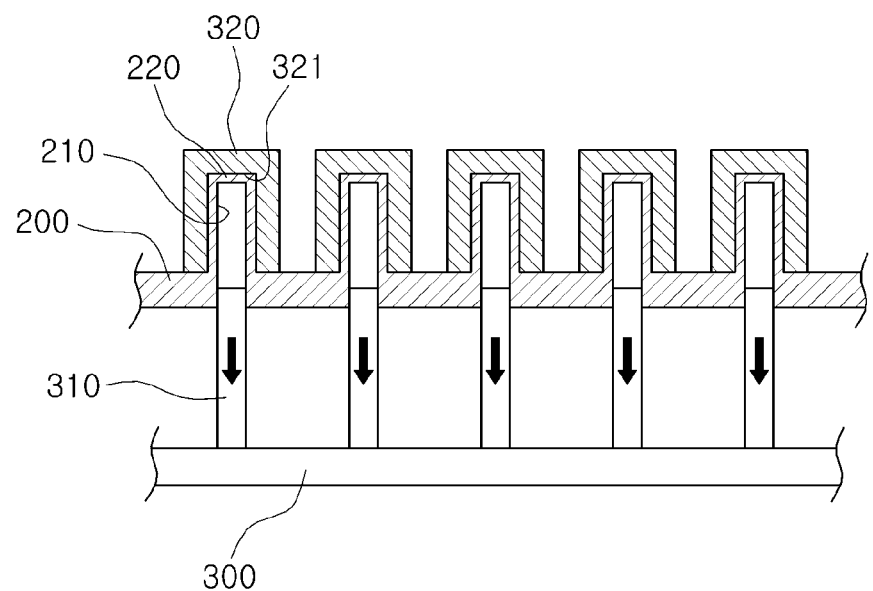
Figure 5E:
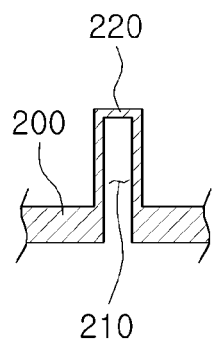

In the positive electrode terminal 20 in the exemplary embodiment in the present disclosure, a forming die 320 having a forming groove part 321 of which a lower surface is open may be disposed on the first conductive metal plate 200 to contact each other (FIG. 5A), and a portion of the first conductive metal plate 200 may be pressurized upwardly from a bottom surface thereof, using a punch 310, so that the portion of the first conductive metal plate 200 is raised inwardly of the forming groove part 321 of the forming die 320 (FIG. 5B).

Here, when the punch 310 is pressurized up to an upper end of the forming groove part 321 of the die 320 by providing a counter pressure so that a pressurized force of the punch 310 at a completion point of an upper side is smaller than that of a start point of a lower side and then the punch returns to an original position thereof (FIGS. 5C and 5D), the protruding part 220 having the groove part 210 of which the lower surface is open may correspond to the forming groove part 321 of the die 320.

In this case, when the counter pressure is not appropriate, for example, only the pressurized force of the punch 310 affects the upper side, the punch 310 may penetrate through an end part of the protruding part 220 to form a hole, which may cause defects.

In addition, the pressurized force which is affected from a lower end of the first conductive metal plate 200 may also upwardly stretch a portion surrounding the protruding part 220 in the first conductive metal plate 200, wherein the counter pressure may prevent the stretch of the first conductive metal plate 200 and only the protruding part 220 may straightly protrude upwardly.

Further, an inner part of the upper end of the forming groove part 321 of the die 320 may be changed into a square shape, a curved surface, or the like, such that an upper end part of the protruding part 220 may be formed in a square shape, a curved surface, or the like, corresponding thereto.

In addition, an upper end part of the punch 310 may be changed into a square shape, a curved surface, or the like, such that an upper end part of the groove part 210 may be formed in a square shape, a curved surface, or the like, corresponding thereto.

Then, by cutting the first conductive metal plate 200 into each protruding part 220 to be classified, the positive electrode terminal 20 including the positive electrode terminal part 21 and the wire connection part 22 protruding upwardly from the positive electrode terminal part 21 may be manufactured.

Here, a reference numeral 300 which is not explained is a supporter supporting the plurality of punches 310.

According to the exemplary embodiment in the present disclosure, since the existing welding process for bonding the manufactured positive electrode terminal part and the manufactured wire connection part to each other at the time of manufacturing the positive electrode terminal is omitted, a production cost may be reduced, and a production yield and properties of products may be improved.

Here, when a size of the punch 310 is controlled, accordingly, a width of the groove part 210 may be controlled, and accordingly, a width of the protruding part 220 may also be changed. For example, when the width of the punch 310 is increased to have an increased width of the groove part 210, an area in which the protruding part 220 which becomes the wire connection part contacts the tantalum wire 11 may be largely increased, and therefore, in this case, ESR of the capacitor may be decreased, and welding defects may be reduced.

FIGS. 6A through 6E are side cross-sectional views illustrating a method of additionally manufacturing the positive electrode terminal in the tantalum capacitor according to another exemplary embodiment in the present disclosure in sequence.

Figure 6A:
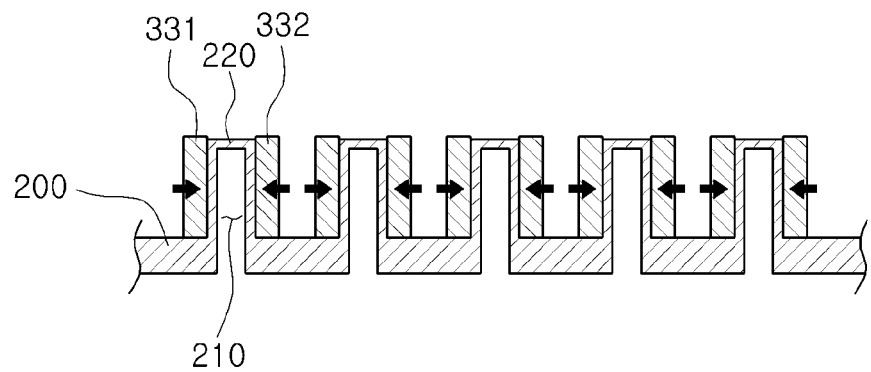
FIGS. 6A through 6D are side cross-sectional views illustrating processes of a method of additionally manufacturing a positive electrode terminal in a tantalum capacitor according to another exemplary embodiment in the present disclosure in sequence.
Figure 6B:
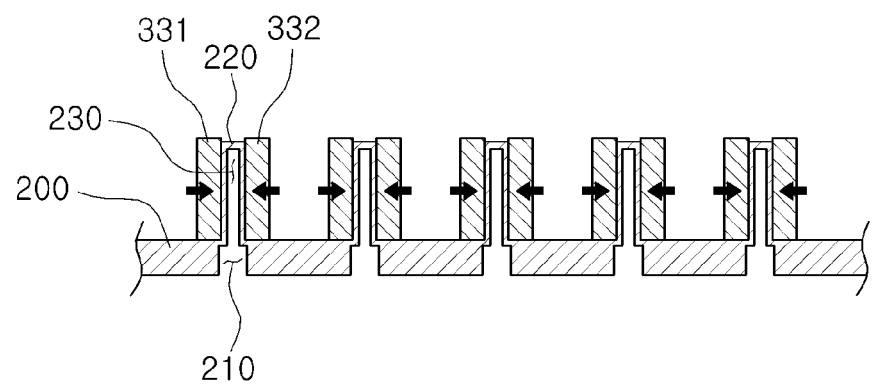
Figure 6C:
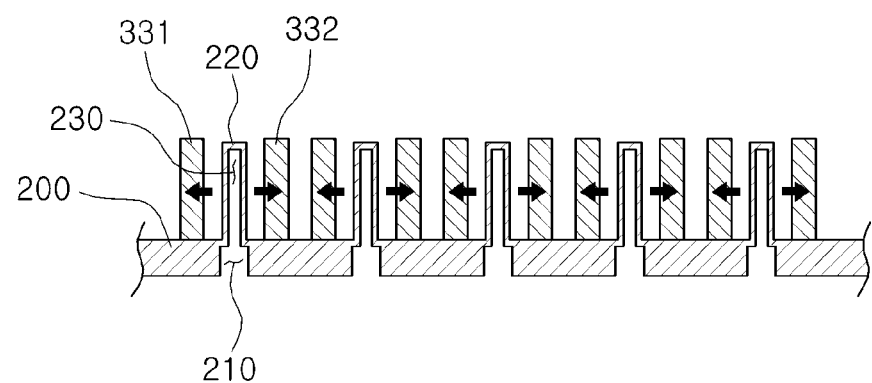
Figure 6D:
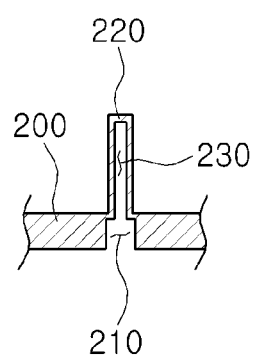

In the positive electrode terminal 20 of the exemplary embodiment in the present disclosure, the punches 331 and 332 are disposed at both sides facing each other of the protruding part 220 on the first conductive metal plate 200 and compressed and pressurized (FIGS. 6A and 6B).

Then, when the punches 331 and 332 return to the original position (FIG. 5C), the groove part and the protruding part 220 may be formed to be thinner and higher than those of the previously described exemplary embodiment, respectively.

Here, the groove part formed in the protruding part 220 maybe communicated with the groove part 210 formed in the first conductive metal plate 200, and a width of the groove part formed in the protruding part 220 maybe smaller than that of the groove part 210 formed in the first conductive metal plate 200.

In addition, the negative electrode terminal 30 may be prepared by cutting the second conductive metal plate to have an appropriate size.

Here, the second conductive metal plate may be formed of the same materials as the first conductive metal plate 200, and the materials thereof may be an alloy including at least one of copper or nickel. However, the present disclosure is not limited thereto.

Here, the negative electrode terminal 30 may have the step 33 formed by treating a portion of a lower surface of the second conductive metal plate by wet etching, or the like.

In addition, in the exemplary embodiment of the present disclosure, the negative electrode terminal 30 may be classified into the negative electrode terminal part 31 and the negative electrode mounting part 32 on which the capacitor body 10 is mounted, based on the step 33.

Here, when a circumference of the capacitor body 10 is molded by a resin, or the like, to be described below, the step 33 may allow the portion 41 of the lower surface of the negative electrode terminal 30 to be filled with molding materials, thereby forming the portion 41 of the molding part, such that adhesion strength between the negative electrode terminal 30 and the molding part 40 may be improved.

Then, the positive electrode terminal and the negative electrode terminal 20 and 30 may be disposed to face each other in parallel in the L direction.

Here, a heat-resistant tape (not shown) maybe attached to lower surfaces of the positive electrode terminal 20 and the negative electrode terminal 30 to connect each other, if necessary.

The heat-resistant tape is to prevent surfaces of the positive electrode terminal 20 and the negative electrode terminal 30 from being contaminated in a molding method to be subsequently progressed.

Then, the capacitor body 10 containing a tantalum powder and having one end surface through which the tantalum wire 11 is exposed may be mounted on the negative electrode mounting part 32 of the negative electrode terminal 30.

Here, the tantalum wire 11 of the capacitor body 10 may be connected to the upper end of the wire connection part 22 of the positive electrode terminal 20.

For example, in a state in which the tantalum wire 11 of the capacitor body 10 contacts the upper end of the wire connection part 22 of the positive electrode terminal 20, the tantalum wire 11 and the wire connection part 22 may be processed by spot welding or laser welding, or may be electrically attached to each other by applying a conductive adhesive, such that the tantalum wire 11 and the positive electrode terminal 20 may be electrically connected to each other.

Meanwhile, before the capacitor body 10 is mounted on the negative electrode mounting part 32, forming a conductive adhesion layer 50 may be performed by applying the conductive adhesive, or the like, on the upper surface of the negative electrode mounting part 32 of the negative electrode terminal 30.

In this case, adhesion strength between the capacitor body 10 and the negative electrode terminal 30 may be improved.

In addition, the conductive adhesive may include an epoxy-based thermosetting resin and a conductive metal powder, and the conductive adhesive layer 50 may be formed by dispensing or dotting a predetermined amount of conductive adhesive to attach the capacitor body 10 and the negative electrode mounting part 32 to each other. Then, when a curing process is performed at a temperature of 150 to 170° C. for 40 to 60 mins in a sealed oven or under a reflow curing condition, the capacitor body 10 and the negative electrode mounting part 32 may not be moved in a state in which they are attached to each other, at the time of molding the resin.

Here, the conductive metal powder may be silver (Ag). However, the present disclosure is not limited thereto.

Next, the molding part 40 may be formed by transfer-molding a resin such as an epoxy molding compound (EMC), or the like, to enclose the tantalum wire 11 and the capacitor body 10.

Here, a temperature of the mold may be about 170° C., and the temperature and other conditions for EMC molding may be appropriately controlled according to components and forms of the EMC to be used.

After molding, a curing process may be performed at a temperature of about 160° C. for 30 to 60 mins in a sealed oven or under a reflow curing condition, if necessary.

Here, the molding process may be performed so that the lower surface of the negative electrode terminal part 31 of the negative electrode terminal 30 and the lower surface of the positive electrode terminal part 21 of the positive electrode terminal 20 are exposed to the outside.

Then, when the forming of the molding part 40 is completed, the heat-resistant tape attached to the lower surfaces of the positive electrode terminal 20 and the negative electrode terminal 30 may be removed, and a deflash process removing a flash produced during the molding process may be further performed.

In addition, a direction of the positive electrode of the tantalum capacitor and corresponding capacitance if necessary may be marked by performing laser marking in a state in which the positive electrode terminal 20 and the negative electrode terminal 30 are attached.

Further, an aging process may be further performed as a subsequent process, if necessary.

The aging process may reduce an electrical distribution caused in an assembly process.

Then, in order to form the electrodes of the chip as it is designed, a process of removing residual portions of the positive electrode terminal 20 and the negative electrode terminal 30 may be performed to finally complete the tantalum capacitor.

As set forth above, according to exemplary embodiments in the present disclosure, the manufacturing process may be simplified, the production yield of the product may be improved, and the incidence rate of the defective products may be decreased by excluding the welding process at the time of manufacturing the positive electrode terminal in the process of manufacturing the tantalum capacitor.

While exemplary embodiments have been shown and described above, it will be apparent to those skilled in the art that modifications and variations could be made without departing from the scope of the present disclosure as defined by the appended claims.

What is claimed is:

1. A tantalum capacitor comprising:
    a capacitor body containing a tantalum powder;
    a tantalum wire having an insertion region disposed in the capacitor body and a non-insertion region exposed through one end surface of the capacitor body;
    a positive electrode terminal including a positive electrode terminal part, a wire connection part protruding upwardly from the positive electrode terminal part to be connected to the tantalum wire, and a groove part extended from a lower surface of the positive electrode terminal to an inner part of the wire connection part;
    a negative electrode terminal having an upper surface on which the capacitor body is mounted; and
    a molding part enclosing the capacitor body and the tantalum wire, and formed to expose a lower surface of the positive electrode terminal part and a lower surface of the negative electrode,
    wherein the groove part includes a first groove part formed in the positive electrode terminal part, and a second groove part formed in the wire connection part to be communicated with the first groove part, and the second groove part has a width narrower than a width of the first groove part, and
    the first groove part has substantially the same width in a vertical direction of the wire connection part, and the second groove part has substantially the same width in the vertical direction of the wire connection part.

2. The tantalum capacitor of claim 1, wherein the positive electrode terminal has a step portion formed on an upper surface of the positive electrode terminal part.

3. The tantalum capacitor of claim 1, wherein the negative electrode terminal has a step formed on a lower surface of the negative electrode terminal so that a portion of the molding part is formed on the lower surface.

4. The tantalum capacitor of claim 1, wherein a conductive adhesion layer is disposed between a lower surface of the capacitor body and the upper surface of the negative electrode terminal.

* * * * *